United States Patent
Nefflier et al.

(10) Patent No.: US 10,147,327 B2
(45) Date of Patent: Dec. 4, 2018

(54) METHOD FOR INTEGRATING A CONSTRAINED ROUTE(S) OPTIMIZATION APPLICATION INTO AN AVIONICS ONBOARD SYSTEM WITH OPEN ARCHITECTURE OF CLIENT SERVER TYPE

(71) Applicant: THALES, Courbevoie (FR)

(72) Inventors: François Nefflier, Toulouse (FR);
Hervé Aulfinger, Toulouse (FR);
Patrick Pierre, Toulouse (FR)

(73) Assignee: THALES, Courbevoie (FR)

( * ) Notice: Subject to any disclaimer, the term of this patent is extended or adjusted under 35 U.S.C. 154(b) by 27 days.

(21) Appl. No.: 15/202,513

(22) Filed: Jul. 5, 2016

(65) Prior Publication Data

US 2017/0011636 A1 Jan. 12, 2017

(30) Foreign Application Priority Data

Jul. 7, 2015 (FR) ..................... 15 01439

(51) Int. Cl.
*G08G 5/00* (2006.01)
*H04L 29/08* (2006.01)
*G06F 8/20* (2018.01)

(52) U.S. Cl.
CPC ............ *G08G 5/0034* (2013.01); *G06F 8/20* (2013.01); *G08G 5/0017* (2013.01); *H04L 67/12* (2013.01)

(58) Field of Classification Search
None
See application file for complete search history.

(56) References Cited

U.S. PATENT DOCUMENTS

2007/0234282 A1 10/2007 Prigge et al.
2015/0150095 A1 5/2015 Mere et al.

FOREIGN PATENT DOCUMENTS

FR 3 013 880 A1 5/2015
FR 3 021 108 A1 11/2015

OTHER PUBLICATIONS

Jorn Altmann et al., "Cost model based service placement in federated hybrid clouds," Future Generations Computer Systems, vol. 41, Dec. 1, 2014, pp. 79-90, XP055263672.
J. Debardelaben et al., "Incorporating Cost Modeling in Embedded-System Design," IEEE Design & Test Computers, vol. 14, No. 3, Jul. 1, 1997, pp. 24-35, XP000783300.

*Primary Examiner* — David P Merlino
(74) *Attorney, Agent, or Firm* — Baker & Hostetler LLP

(57) ABSTRACT

A method for integrating a constrained aircraft route(s) optimization application is implemented in an avionics onboard system comprising a DAL+ core computer and a DAL− peripheral computer for managing the application. The method of integration determines an optimal functional and physical distribution of the elementary functions OPT_RTE_FU(i) of the application within the onboard avionics system over the set of possible distributions which minimizes a global cost criterion CG, dependent on several parameters, including at least the additional development cost of the elementary functions integrated within the DAL+ digital core computer, and carries out the integration of the application.

16 Claims, 7 Drawing Sheets

METHOD FOR INTEGRATING A CONSTRAINED ROUTE(S) OPTIMIZATION APPLICATION INTO AN AVIONICS ONBOARD SYSTEM WITH OPEN ARCHITECTURE OF CLIENT SERVER TYPE

CROSS-REFERENCE TO RELATED APPLICATION

This application claims priority to foreign French patent application No. FR 1501439, filed on Jul. 7, 2015, the disclosures of which are incorporated by reference in their entirety.

FIELD OF THE INVENTION

The present invention relates to a method for integrating a service or application for optimizing one or more routes of an aircraft under constraints into an open-architecture avionics onboard system of client-server type.

The present invention also relates to the integration architecture of the onboard system with open architecture integrating the constrained route(s) optimization service.

The present invention further relates to the implementation of the constrained route(s) optimization service integrated into the onboard avionics system.

The invention lies in the field of onboard systems, and more particularly that of avionics systems which implement an onboard navigation computer, such as the Flight Management System FMS.

BACKGROUND

In a conventional manner, each real-time avionics system is architectured and developed so as to meet performance requirements in terms in particular of failure rate (reset) and functional Quality of Service (QoS), in a defined framework of use.

Onboard avionics systems are qualified, with a demonstrated performance level, for a given environment and have different levels of software development, that are more or less expensive, corresponding to different safety or criticality requirements. Indeed, these levels of software development arise from the aircraft risk analysis FHA (Functional Hazard Analysis), termed "operating dependability analysis", according to the international standards RTCA DO178C (USA) or ED-12C (European equivalent of EUROCAE). This risk analysis establishes the contribution of each function in the aircraft's operational chain so as to determine which maximum failure level must be reached. In order to achieve the objective in question, the standard constrains the required quality of the hardware and software in which the function is embedded and which implements it. These development quality levels are called "DALs" (Development Assurance Levels).

Current avionics architectures are the result of a history, in which economic considerations have played a significant role. Thus, for reasons to do with "certification credit" or incremental qualification, and also for reasons to do with wiring costs relating to the interfaces, the new navigation functions have been systematically integrated within a single computer, namely either the flight management system FMS, the taxiing system TAXI or the Automatic Pilot PA.

Likewise, monitoring functions are systematically integrated within a single computer, depending on what is monitored: TCAS (Traffic Collision Avoidance System), TAWS (Terrain Awareness System), WMS (Weather Management System), the CMU ("Communication Management Unit", airspace-related constraints), the EFB ("Electronic Flight Bag", operational constraints of the company).

Likewise, the monitoring of the aircraft states is centralized in computers of FWS (Flight Warning Systems) and OMS (Onboard Maintenance Systems) type.

Currently, the automatic pilot PA is developed in DAL level A which corresponds to the highest safety level, and the FMS is, depending on the aircraft, developed in DAL level B or C, with a trend to switch to DAL development level B in view of its increasing use in procedures. The TCAS for its part is developed in level DAL C or DAL D, and acts as a safeguarding device, it not being used to guide the craft but to forewarn of danger when the other systems have failed.

Now, for iso-functional, that is to say for one and the same operationally rendered service, it may be estimated that each change of DAL development level multiplies the development cost tenfold. Indeed, when the software development level increases from D to A via C and B, the safety requirement increases, this being manifested by an increase in the complexity of the algorithm and its degree of validation.

Thus, a visual aid function for navigation, whose risk analysis FHA requires a level D, is currently integrated into one of the existing computers, FMS or PA, of level A to C, and this has given rise to a development cost of ten to a hundred times greater than it would have been in a level D hardware environment.

On top of this development cost, the insertion of new functions or services into an existing architecture frequently leads to complex solutions between the systems, which generate a training load for crews and maintenance teams, and increases the risk of error when operating the equipment in order to carry out the function.

Solutions are currently proposed in a first French patent application published under the number FR3013880 and a second French patent application filed on 16 May 2014 and registered under the filing number 14/01108 aimed at integrating into an avionics system, comprising a core module and a peripheral module, additional functionalities without needing to modify the software elements of the core module and using from the latter only generic services that are offered. Thus, the impact of integrating new services or functionalities on a core module of high development level such as an FMS and/or an PA is minimized.

However, the insertion of new hardware, of peripheral type, and of a lower development level than that of a core module, into existing so-called "Legacy" architectures, and supporting new functionalities of compatible development level, itself has a crippling development cost in terms in particular of the re-wiring of thousands of aircraft, the hardware integration of the new computer into the bay for interfacing it with other equipment, and its electrical power supply.

Thus, the technical problem of defining an architecture of an avionics onboard system which is more flexible and more adaptable, and which makes it possible to ensure the integration of new navigation functions at minimum cost, while guaranteeing clients the DAL level of the whole, still remains.

Thus, this need exists particularly when involved with defining a navigation architecture within an onboard navigation system with open architecture of server-client type which makes it possible to integrate a constrained aircraft route(s) optimization service.

It should be noted that the current powerful constrained route optimizers which are operationally beneficial are developed on the basis of uncertifiable software techniques that consume a great deal of computation time and memory and are unsuitable for existing avionics computers. Likewise, functions for modelling external constraints (acquisition and cropping of traffic, of the weather or of the terrain) are performed by specialized computers that cannot be integrated into a current "optimal" route computation system of FMS type.

This therefore involves redefining collaborations and functions between aircraft systems which make it possible to compute an optimal operational route under constraints of various types (traffic, terrain, weather, aircraft state, airspace, operations), which minimize the costs of integration into an open architecture navigation system whose core is a high DAL computer of FMS and/or PA type and at least one peripheral computer of lower DAL, which minimize the costs of staff training and maintenance, and which minimize more particularly the impact on the computers of high criticality (in particular the FMS whose development cost is currently among the highest of the aircraft because of its size and criticality).

The technical problem is to propose a method for operationally, functionally and physically integrating a service or application for optimizing routes under various constraints (traffic, terrain, weather, aircraft state, airspace, operations) into an onboard avionics system of "client-server" type, which minimizes the means for developing the integration of the application in terms of extra hardware, interfacing and software, of reuse of hardware, interfacing and software, of number of tasks and of hardware and software qualification time, and which minimizes the means for operating the application in terms of maintenance and staff training time, while guaranteeing the client the DAL level of the aircraft as a whole.

The technical problem is also to provide an application for optimizing route(s) of an aircraft under various constraints (traffic, terrain, weather, aircraft state, airspace, operations), which is integrated operationally, functionally and physically into an open architecture of an onboard avionics system of "client-server" type, and which minimizes the means for developing the integration of the application in terms of extra hardware, interfacing and software, of reuse of hardware, interfacing and software, of number of tasks and of hardware and software qualification time, and which minimizes the means for operating the application in terms of maintenance and staff training time, while guaranteeing the client the DAL level of the aircraft as a whole.

The technical problem is further to provide an integrating onboard avionics system with open architecture of "client-server" type which operationally, functionally and physically integrates an application for optimizing routes under various constraints (traffic, terrain, weather, aircraft state, airspace, operations) while minimizing the means for developing the integration of the application in terms of extra hardware, interfacing and software, of reuse of hardware, interfacing and software, of number of tasks and of hardware and software qualification time, and which minimizes the means for operating the application in terms of maintenance and staff training time, in compliance with the DAL level of the aircraft as a whole.

For this purpose, the subject of the invention is a method for functionally and physically integrating a constrained aircraft route(s) optimization application into an avionics onboard system, the avionics onboard system comprising:

a DAL+ digital core computer, having a first criticality level DAL+, integrated into an initial architecture of peripheral computers and databases having second criticality levels DAL−, lower than or equal to the first criticality level DAL+, and serving as server by hosting a first plurality of generic open services Serv_DAL+(j); and a DAL− peripheral computer for managing the constrained route(s) optimization application, having a second criticality level DAL−, which is lower than or equal to the first criticality level DAL+, and serving as client by dispatching service requests to the DAL+ digital core computer and/or to the peripheral computers and databases of the initial architecture through a communications network; characterized in that the method for functionally and physically integrating the constrained route(s) optimization application comprises the steps consisting in:

functionally decomposing the constrained route(s) optimization application OPT_RTE into a second plurality of elementary functions OPT_RTE_FU(i); and determining, on the basis of the second plurality of the elementary functions OPT_RTE_FU(i), a first list of the elementary functions that can be executed in part or entirely by at least one generic open service, and for each elementary function a first sub-list of generic open service(s); and determining an optimal functional and physical distribution of the elementary functions OPT_RTE_FU(i) within the onboard avionics system over the set of possible distributions which minimizes a global cost criterion CG, dependent on several parameters, including at least the additional development cost of the elementary functions integrated within the DAL+ digital core computer; and carrying out the integration of the constrained route(s) optimization application by actually implementing the elementary functions and their scheduling according to the optimal functional and physical distribution determined within the onboard avionics system in the previous step of determining the optimal functional and physical distribution of the elementary functions.

According to particular embodiments, the method for functionally and physically integrating the application for optimizing routes under various constraints comprises one or more of the following characteristics:

the optimal functional and physical distribution of the elementary functions OPT_RTE_FU(i) within the onboard avionics system over the set of possible distributions is determined so as to minimize a first global cost criterion CG1 which takes into account only the additional development cost of the elementary functions integrated within the DAL+ digital core computer; and the integration of the constrained route(s) optimization application is carried out by actually implementing the elementary functions and their scheduling according to the optimal functional and physical distribution determined within the onboard avionics system by using the first criterion CG1;

the optimal functional and physical distribution of the elementary functions OPT_RTE_FU(i) within the onboard avionics system over the set of possible distributions is determined so as to minimize a second global cost criterion CG2 which also takes into account the development cost of the communication interfaces between the DAL+ core computer and the peripheral computers, the cost in response time and the cost of maintainability so as to minimize the communication exchanges; and the integration of the constrained route(s) optimization application is carried out by actually implementing the elementary functions and their scheduling according to the optimal functional and physical distribution determined within the onboard avionics system by using the second criterion CG2;

the optimal functional and physical distribution of the elementary functions OPT_RTE_FU(i) within the onboard avionics system over the set of possible distributions is determined so as to minimize a third global cost criterion CG3 which also takes into account the development of certain segments of code of low DAL level in the DAL+ core computer so as to minimize the complexity of the whole from the perspective of maintenance and upgrades; and the integration of the constrained route(s) optimization application is carried out by actually implementing the elementary functions and their scheduling according to the optimal functional and physical distribution determined within the onboard avionics system by using the third criterion CG3;

the optimal functional and physical distribution of the elementary functions OPT_RTE_FU(i) within the onboard avionics system over the set of possible distributions is determined so as to minimize a fourth global cost criterion CG4 which also takes into account the use of DAL+ level code libraries in the peripheral computer of DAL− level so as to minimize the use of the resources of the DAL+ core computer; and the integration of the constrained route(s) optimization application is carried out by actually implementing the elementary functions and their scheduling according to the optimal functional and physical distribution determined within the onboard avionics system by using the fourth criterion CG4;

the method for functionally and physically integrating the constrained aircraft route(s) optimization application furthermore comprises an additional step, executed after having determined an optimal functional and physical distribution of the elementary functions OPT_RTE_FU(i) within the onboard avionics system, and consisting in the constrained route(s) optimization application performance being verified and evaluated by emulation or simulation, and/or the performance of the initial services implemented on the core computer and the peripheral computers being verified;

the DAL+ digital core computer hosts services Serv_DAL+(j) for computing flight plan, lateral trajectory and temporal predictions according to a specified guidance mode, which are used for the implementation of part of the elementary functions forming the constrained route(s) optimization application; and the DAL+ digital core computer is coupled to computers for piloting the aircraft;

the first plurality of generic services Serv_DAL+(j) comprises the following services: computation of the location of the aircraft, flight plan insertion/modification, lateral trajectory computation, vertical trajectory computation, aircraft performance computation, lateral guidance, vertical guidance, guidance in terms of speed, consultation of navigation database, consultation of aircraft performance database, consultation of configuration database, consultation of magnetic declination database, display of the route and of the trajectory, display of the database elements;

the constrained aircraft route(s) optimization application comprises the following elementary functions:

A first elementary function OPT_RTE_FU(1) for selecting a "target route";

A second elementary function OPT_RTE_FU(2) for computing the predictions along the flight plan and the trajectory A third elementary function OPT_RTE_FU(3) for selecting the constraints to be applied;

A fourth elementary function OPT_RTE_FU(4) for selecting a minimum spacing to be complied with;

A fifth elementary function OPT_RTE_FU(5) for displaying the route and the constraints to an operator;

A sixth elementary function OPT_RTE_FU(6) for detecting conflict between the current route and the constraints;

A seventh elementary function OPT_RTE_FU(7) for displaying the navigation elements arising from the databases around the trajectory and/or around the constraints;

An eighth elementary function OPT_RTE_FU(8) for avoidance computation to resolve the conflict between the route and the constraint;

A ninth elementary function OPT_RTE_FU(9) for integrating the avoidance into the current route, intended to be reused by the second elementary function OPT_RTE_FU(2) to determine the new flight plan (the new trajectory);

A tenth elementary function OPT_RTE_FU(10) for executing the new route

An eleventh elementary function OPT_RTE_FU(11) for monitoring the evolution of the constraints at regular intervals;

the elementary functions OPT_RTE_FU(2), OPT_RTE_FU(5), OPT_RTE_FU(7), OPT_RTE_FU(8) and OPT_RTE_FU(10) are allocated to the and implemented in the DAL+ digital core computer, while the remaining elementary functions are allocated and implemented in a DAL− peripheral computer of the system integrating the constrained route(s) optimization application;

the elementary function FIM_FU(10) which corresponds to the service Serv_DAL+(4) for the selected guidance mode and the selected navigation element is allocated to the and implemented in the digital core computer 4 DAL+, while the remaining elementary functions are allocated and implemented in a DAL− peripheral computer of the system integrating the constrained route(s) optimization application;

the elementary functions OPT_RTE_FU(2), OPT_RTE_FU(5), OPT_RTE_FU(7), OPT_RTE_FU(8) and OPT_RTE_FU(10) are allocated to the and implemented in the DAL+ digital core computer, while the remaining elementary functions are allocated and implemented in a DAL− peripheral computer of the system integrating the constrained route(s) optimization application;

the first elementary function OPT_RTE_FU(1) consists in selecting a "target route" defined by one of the following elements: a target airport, a target reference route, a portion of target reference route, a reference trajectory, a set of waypoints defined by the pilot, a set of waypoints and of navigation beacons selected from the navigation database;

the second elementary function OPT_RTE_FU(2) computes predictions along the flight plan and the trajectory, including in particular the predicted position in 3D and optionally in time of the aircraft along the trajectory, the predicted position in time making it possible to manage the dynamic or evolving constraints;

the third elementary function OPT_RTE_FU(3) selects constraints to be applied, these constraints being defined by geographical geometric shapes or raw visual representations such as volumes which model (in particular, clouds, 3D airspaces and obstacles), surfaces in 3D, especially terrain surfaces, surfaces in 2D, especially boundaries, and changes of airspaces.

The subject of the invention is also an avionics onboard system configured to implement a constrained aircraft route(s) optimization application and integrate it functionally and physically, the avionics onboard system comprising:

a DAL+ digital core computer, having a first criticality level DAL+, integrated into an initial architecture of peripheral computers and databases having second criticality levels DAL−, lower than or equal to the first criticality level DAL+, and serving as server by hosting a first plurality of generic open services Serv_DAL+(j); and a DAL+ peripheral computer for managing the constrained route(s) optimization application, having a second criticality level DAL−, and serving as client by dispatching service requests to the DAL+ digital core computer and/or to the peripheral computers and peripheral databases of the initial architecture through a communications network;

the constrained route(s) optimization application OPT_RTE being decomposed into a plurality of elementary functions OPT_RTE_FU(i) distributed physically between the DAL+ digital core computer and the DAL− peripheral management computer according to an optimal distribution scheme determined by the method of integration defined above, and the DAL− peripheral management computer being configured to support an application from among: an MMI, an integrated MSI, a CMU, a TCAS, a TAWS, an EFB, a tablet, a TRAFFIC COMPUTER, a dedicated generic partition; and the DAL+ digital core computer being configured to support an application from among: a flight management system FMS, an Automatic Pilot (PA), an FMGS system combining the FMS and PA functions.

BRIEF DESCRIPTION OF THE DRAWINGS

The invention will be better understood on reading the description of several embodiments which will follow, given solely by way of example and while referring to the drawings in which.

DETAILED DESCRIPTION

Figure 1:
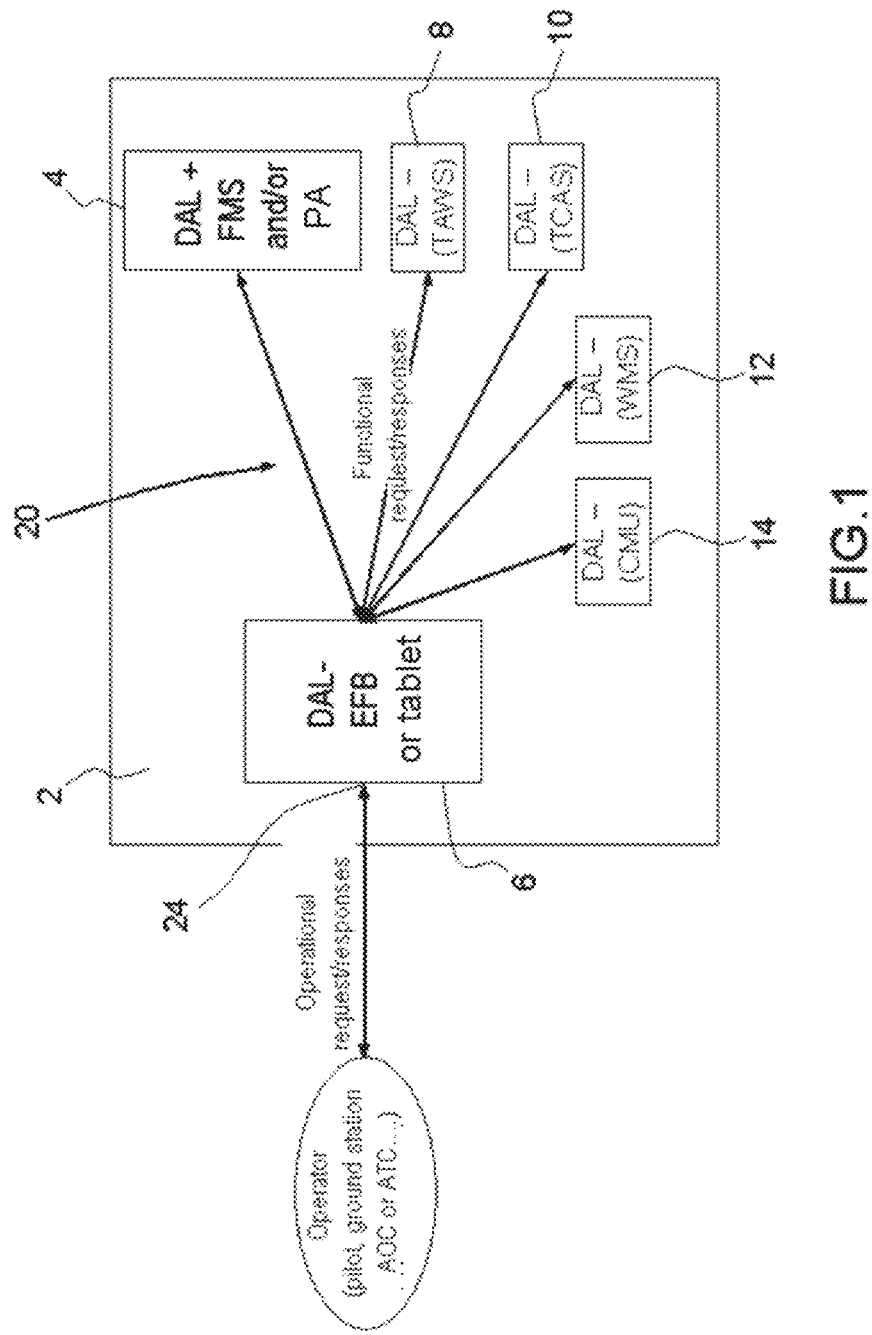
FIG. 1 is a view of a flight management system of FMS type for an aircraft, configured to implement the constrained route(s) optimization function, the said application being integrated according to a method of integration of the invention.

According to FIG. 1, an onboard navigation system 2 comprises at least two computers one of which is a digital navigation core computer 4 and at least one peripheral computer, here five peripheral computers 6, 8, 10, 12, 14 and a communications network 20 linking the digital core computer 4 and the at least one peripheral computer 6, 8, 10, 12, 14, the said communications network 20 being represented only in a functional manner in FIG. 1.

Computer is generally understood to mean a hardware and software computation chain. A computer can consist of several housings and/or hardware boards and/or of several software partitions. The redundancy, dissimilarity, surveillance and monitoring of a computation by a second chain or any other diversification method known to the person skilled in the art enter into the definition of this term.

The navigation system 2 is configured to implement an application OPT_RTE for optimizing routes under various constraints (traffic, terrain, weather, aircraft state, airspace, operations).

One of the peripheral computers, here the computer 6, is a tablet or an EFB (Electronic Flying Bag), configured to manage or coordinate the tasks of the application OPT_RTE and referred to as the management computer. The peripheral management computer 6 for the application OPT_RTE is connected through the communication network 20 to the digital core computer 4 DAL+ and to the other four peripheral computers 8, 10, 12, 14 so as to exchange various functional requests and responses.

The digital core computer 4 is configured to support the FMS and/or PA functionalities while the peripheral computers 8, 10, 12, 14 are configured to support respectively the TAWS (Terrain Awareness and Warning System), TCAS (Traffic Collision Avoidance System), WMS (Weather Management System) and CMU (Communications Management Unit) functionalities.

The peripheral computer 6 for managing or coordinating the tasks of the application OPT_RTE comprises an inputs/outputs interface 24 for exchanging operational requests and responses with an operator environment 26 consisting for example of a pilot, an AOC (Airline Operational Communications) or ATC (Air Traffic Control) ground station.

The digital core computer 4 is configured to operate in particular as a server hosting a first plurality of generic open services Serv_DAL+(j), j being a pointing index of the generic service, and possesses a first safety level of software development or criticality DAL+.

The peripheral computers 6, 8, 10, 12, 14 possess a second safety level of software development DAL−, which is lower than or equal to the first safety level of software development DAL+, and among them at least the peripheral computer 6 for managing the optimization application OPT_RTE is configured to operate as a client in relation to the server 4.

Each computer of the onboard system is architectured and developed so as to address performance requirements, in particular in terms of failure rate (reset) and functional Quality of Service (QoS), in a defined framework of use. The onboard systems are qualified, with a demonstrated performance level, for a given environment.

These computers have different software development levels, which are more or less expensive: These software development levels arise from the aircraft risk analysis FHA (Functional Hazard Analysis), termed "operating dependability analysis", according to the international standards RTCA DO178C (USA) or ED-12C (European equivalent of the EUROCAE). The operating dependability analysis establishes the contribution of the function in the aircraft operational chain to determine which maximum failure level (failure rate) must be reached. In order to achieve the objective in question, the standard constrains the required quality of the hardware and software in which the function is embedded.

Five separate levels of software development exist, from the most critical (level A) to the least critical (level E) in the standards RTCA DO178C and ED-12C:

Level A: A fault with the system or sub-system studied may cause a catastrophic problem—Flight safety or landing compromised—Aircraft crash Level B: A fault with the system or sub-system studied may cause a major problem entailing serious damage or indeed the death of some occupants Level C: A fault with the system or sub-system studied may cause a serious problem entailing a malfunction of the vital equipment of the craft Level D: A fault with the system or sub-system studied may cause a problem that could interfere with flight safety Level E: A fault with the system or sub-system studied may cause a problem that does not affect flight safety These levels of software safety development are called "DALs" (Development Assurance Levels). The constraint in hardware and software terms is fixed at the following values:

Level A: a maximum failure rate of $10^{-9}$/FH (FH=Flight Hours)

Level B: a maximum failure rate of $10^{-7}$/FH (FH=Flight Hours)

Level C: a maximum failure rate of $10^{-5}$/FH (FH=Flight Hours)

Level D: a maximum failure rate of $10^{-3}$/FH (FH=Flight Hours)

Level E: a maximum failure rate of $10^{-1}$/FH (FH=Flight Hours)

The peripheral computer 6 DAL− for managing the application is a peripheral computer configured to support an application from among:
an MMI, an integrated MSI,
a CMU
a TCAS
a TAWS
an EFB
a tablet
a TRAFFIC COMPUTER
a dedicated generic partition The digital core computer 4 DAL+ is configured to support an application from among:
a flight management system FMS,
an Automatic Pilot (PA)
an FMGS system combining the FMS and PA functions.

In this implementation, a function for allocating and sequencing elementary functions OPT_RTE_FU(i) carrying out the operational optimization application OPT_RTE can be implemented in the method of integration by a computer independent of the onboard avionics system 2, or hosted in one of the applications (for example in an EFB or tablet for dialogue with pilot or crew member, in a CMU for dialogue with the ground (company, control centres) or in the core computer 4 DAL+ which in this case acts as filter.

Figure 2:
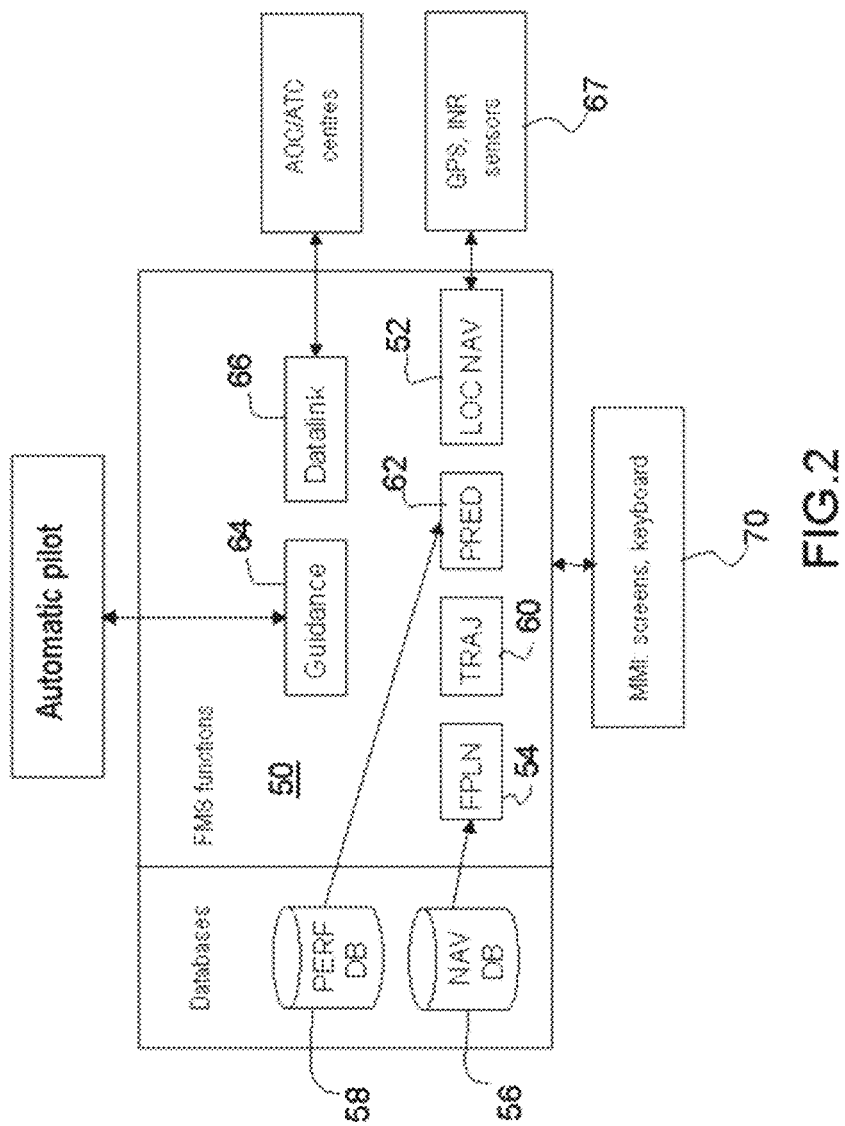
FIG. 2 is a view of the architecture of a DAL+ core computer supporting the FMS functionalities.

According to FIG. 2 and an exemplary functional architecture, a digital core computer 4 DAL+ supporting a standard FMS application 50 according to the ARINC 702A standard (Advanced Flight Management Computer System, December 1996), is configured to ensure all or part of the functions of:

Navigation LOCNAV 52 for performing optimal location of the aircraft as a function of geo-location means (GPS, GALILEO, VHF radio beacons, inertial platforms);

Flight plan FPLN 54 for inputting the geographical elements constituting the skeleton of the route to be followed (departure and arrival procedures, waypoints, airways);

Navigation database NAVDB 56 for constructing geographical routes and procedures with the help of data included in the bases (points, beacons, interception or altitude legs . . . );

Performance database, PRF DB 58, containing the craft's aerodynamic and engine parameters.

Lateral trajectory TRAJ 60 for constructing a continuous trajectory on the basis of the points of the flight plan, complying with the aircraft performance and with the confinement constraints (RNP);

Predictions PRED 62 for constructing an optimized vertical profile on the lateral trajectory;

Guidance GUIDANCE 64 for guiding in the lateral and vertical planes the aircraft on its 3D trajectory, while optimizing the speed;

Digital data link DATALINK 66 for communicating with the control centres and other aircraft.

One of the roles of the FMS is to locate the aircraft by using its sensors 67 (inertia platforms, GPS, radioelectric beacons). This is the LOC NAV part 52.

On the basis of the geographical information contained in the navigation database NAV DB 56, the pilot can construct his route, called the flight plan and comprising the list of waypoints. This is the role of the FPLN part 54. The FMS can manage several flight plans. One of them, known by the acronym "Active" in ARINC 702A designates the flight plan on which the aircraft is guided. There are working flight plans (sometimes called "secondary" or "inactive flight plans"), as well as transient flight plans (temporary flight plans).

The lateral trajectory is computed as a function of the geometry between the waypoints (commonly called LEGs) and/or the altitude and speed conditions (which are used for computing the turning radius), by the TRAJ part 60.

Over this lateral trajectory, the FMS 50 optimizes a vertical trajectory (in terms of altitude and speed), passing through possible altitude, speed, time constraints, by using a modelling of the aerodynamic and engine performance contained in the PERF DB 58.

Knowing the location of the aircraft and the 3D trajectory, the FMS 50 can slave the aircraft to this trajectory. This is the GUIDANCE part 64.

All of the information entered or computed by the FMS 50 is grouped together on MMI display screens 70 (MFD pages, NTD and PFD, HUD or other views).

The communication with the ground (company, air traffic control) is carried out by the DATALINK part 66.

It should be noted that in the FMS terminology, the term "revision" is used to characterize an insertion/modification/erasure of data of the FMS system and that the word "Edition" is also commonly used.

In the current architectures and whatever the aircraft, the "Flight Planning" and "optimized trajectory" part is generally included in a dedicated computer called the "FMS" for "Flight Management System" (or flight management computer). These functions constitute the FMS business core. This system can also host part of the "Location" and of the "Guidance". In order to ensure its mission, the FMS is connected to numerous other computers (a hundred or so).

Figure 3:
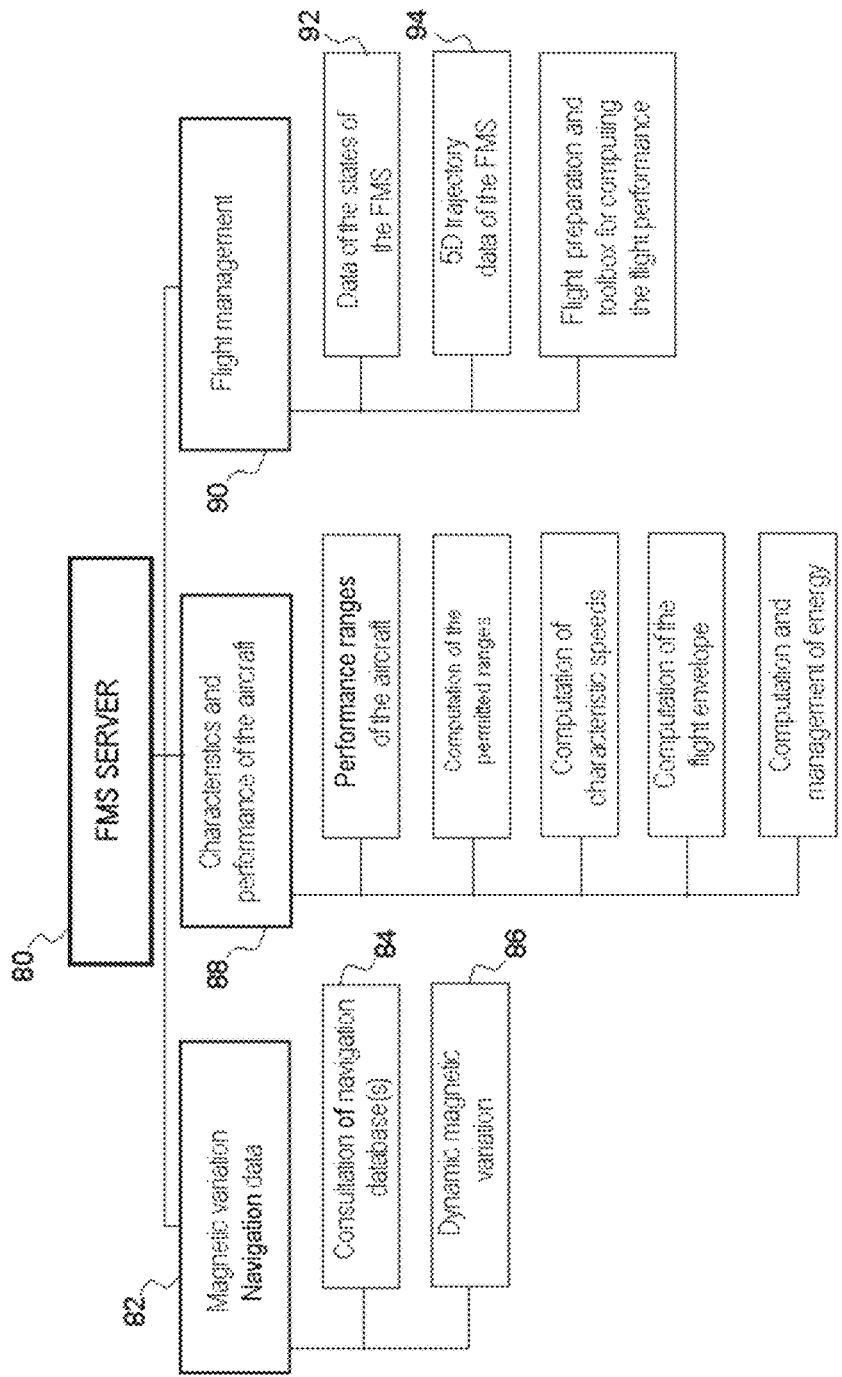
FIG. 3 is a view of the tree structure of the library of generic services offered by the DAL+ level computer supporting the FMS generic functionalities and acting as server.

According to FIG. 3, the generic open services Serv_DAL+(j) of a DAL+ computer supporting the set 50 of FMS functionalities make up an FMS server 80 and are classed in three categories.

A first category 82 of generic open services relates to the services for consulting geographical data 84 and magnetic declination 86 (or "navigation data & dynamic magnetic variation") which allow the clients to search for and manipulate geographical information (NAV DB) or magnetic declination information (MAG VAR) on a point of the globe, most procedures still being referred to magnetic north.

A second category 88 of generic open services relates to the services for consulting the performance of the aircraft ("aircraft characteristics & performance") involving TRAJ, PRED and PERF DB.

The services of the second category 88 provide:
bounds characteristic of the aircraft such as for example the minimum and maximum weights, the certified altitude ceiling; the takeoff and landing speeds, termed characteristic speeds; flight envelope computations (maximum speeds, stalling speeds, maximum roll, etc.)
integration computations according to chosen aircraft modes (climb a certain number X of feet at constant thrust, descend with determined air slope and frozen speed, turn with imposed angle, etc.), default computations (for some FMSs, simplified performance computations can be defined in the PERF DB, just where the precision required is lower).

A third category 90 of generic open services relates to the "flight management" services, namely:
the consultation of the state of the aircraft 92 (position, speed, states of the systems connected to the FMS, such as the engines state, the automatic pilot engaged modes, etc.)
the consultation and modification 94 of the flight plan and of the 5D trajectory;
the consultation and modification of the flight initialization data (inputting of the takeoff speeds, cruising altitude, expected weather, modes of fuel consumption, etc.)
the services for predictions over a given time horizon according to defined modes of flight conduct (guidance) and aircraft state, such as for example in the cases:
of an automatic pilot wishing to ascertain the mean climb rate over 2000 ft of altitude change with 1 failed engine, of a fuel computer wishing to compare the average consumption with the FMS predictions of consumption, etc.
of a TCAS computer wishing to ascertain the horizontal (or 3D) progress of the aircraft according to a mode with determined lateral guidance and determined guidance in terms of speed.

Certain requests of generic open services, termed elementary, may correspond to unitary requests of generic services such as for example:
a request to retrieve airports around the aircraft, corresponding to a unitary service "Get_Airport" of the navigation database consultation service
a request to insert a company Route in the AEEC ARINC 424 format for example, for a client is also a unitary service "INSERT_COROUTE" offered by the "Flight Preparation" part of the figure hereinabove
a request to consult the aircraft state (current fuel for example) corresponds to a Get_current_Fuel unitary service offered by the "Aircraft States" part a request to consult the aircraft's current flight envelope (min and max speeds for example) corresponds to a unitary service Get_flight_envelope offered by the "Flight envelope Computation" part.

Other more complex requests can be made up of a succession of elementary requests in the form of groups (or batches) of commands, such as typically, an "INSERT FPLN" request for inserting a flight plan as separate elements, such as performed currently by the DATALINK services for the companies (AOC) and control centres (ATC), defined in the ARINC standards 702A for AOC and DO258 for ATC.

The insertion of a complete flight plan is an "INSERT FPLN" request which in general comprises the following parameters, defined in the standards in question, namely:
Elements making it possible to compute the route to be followed:
Airports (departure, arrival, alternate)
Takeoff procedures (known as departure runway, SID, etc.)
Cruising procedures (known as airways)
Arrival procedures (known as arrival runway, STAR, VIA, etc.)
Go-around procedures (known as Missed Approach)
Clearance procedures on arrival to a diversion airport (known as alternate)
Waypoints in addition to the procedures
Navigation beacons
Altitude, speed, time constraints over the points arising from the above procedures or over the waypoints
Flight plan initialization elements, making it possible in addition to carry out the trajectory computations and predictions, namely:
The cruising level
The weight planned on takeoff
The performance index (known as Cost Index)
The initial position on takeoff
Environment elements over the flight plan:
Weather forecast along the flight plan in the form of wind and temperature data over the points arising from the above procedures or over the waypoints
Barometric setting forecast on departure and on arrival According to FIG. 4, a method 202 OPEN_OPT_RTE for functionally and physically integrating a constrained route(s) optimization application into an avionics onboard system 2, of open architecture such as defined in FIG. 1, comprises a set of first, second, third, fourth, fifth, sixth, seventh steps 204, 206, 208, 210, 212, 214, 216.

In the first step 204, the compatibility of the criticality level of the constrained route(s) optimization function OPT_RTE with the development level of the DAL+ core computer is verified. After having determined the criticality level associated with the function OPT_RTE, it is compared with the criticality level of the DAL+ core computer. If the level of the function OPT_RTE is lower than or equal to that of the DAL+ core computer, the function is a candidate to be implemented in part on a DAL− computer of lower level in the broad sense. Otherwise the function OPT_RTE must be executed reusing the architecture of the system so as to include therein a computer of higher criticality level than that of the DAL+ digital core computer initially planned.

An operational function for proposing an alternative route to anticipate one or more non-immediate constraints may be of low level (for example of criticality level D or E) and correspond to:

A weather contingency or hazard expected several tens of minutes or several hours ahead of the aircraft, or indeed on arrival;

A non-immediate terrain/obstacle contingency or hazard, for example a change of route within a mountainous terrain still ahead of the aircraft or the presence of airspaces which are restricted as a function of timetables;

A distant traffic contingency or hazard, for example congestion expected in an airspace subsequent to traffic restrictions, or strikes;

A company contingency, for example a need to reroute for connection reasons (hub), or to embark passengers from an intermediate airport;

A distant airport contingency, for example a runway closure, black ice on runways, a problem with disembarkation;

A not too serious contingency internal to the aircraft, for example the failure of a non-critical computer;

Or any set of constraints of this type. Note that an accumulation of constraints can increase the criticality level: typically a distant terrain contingency (mountainous zone) coupled with an aircraft limitation requiring it to fly below a certain ceiling (depressurization, pressure-related medical problem on-board) will have to generate a clear route of the terrain, in a more reliable manner.

An operational function for proposing an alternative route to anticipate a stronger constraint may be of medium level (for example of criticality level C or D) and correspond to:

A weather contingency or hazard currently building up a few tens of minutes or less ahead of the aircraft, for example a cumulonimbus formation, arrival in a zone of freezing clouds etc;

A medium-term terrain/obstacle contingency or hazard, for example a change of route within a mountainous terrain currently followed or activation of restriction of airspaces in a few tens of minutes or less;

A medium-term traffic contingency, for example arrival in a busy airspace, a medium-term conflict detected with other craft nearby;

A company contingency, for example a need to reroute for more critical reasons (a medical emergency), to embark passengers during an evacuation of a country;

A closer airport contingency, for example a runway closure, black ice on runways, a problem with disembarkation;

A more serious contingency internal to the aircraft, for example the failure of a critical computer, depressurization of the cabin, engine failure.

Next, in the second step 206, the generic services offered by the computational capabilities of the DAL+ digital core open-architecture navigation computer are catalogued and classified according to a library of services Serv_DAL+(1), ..., Serv_DAL+(j), ... Serv_DAL+(n_Serv), these generic services resulting from the open architecture concepts that are beginning to be seen in critical computers such as for example the FMS.

The general classification of these services Serv_DAL+(j) in the case of a digital core computer supporting the FMS functionalities is described in FIG. 3 and the description text relating thereto.

In the case of constrained route optimization OPT_RTE, the second step 206 will use the requests for modification (or redefinition) of flight plan, lateral trajectory computation, computation of the vertical predictions over a time horizon, predicted modes of vertical flight conduct (or guidance).

Thus for a core computer 4 DAL+ supporting the FMS functionalities and having an open architecture, the following services are listed:

Consultation services Serv_DAL+_CONSULT, which include:

services Serv_DAL+_CONSULT(1) for consulting geographical databases of the FMS (NAVDB, MAGVAR, airport BDD (database), pilot database);

services Serv_DA+L_CONSULT(2) for consulting the aircraft performance database of the FMS (PERFDB);

services Serv_DAL+_CONSULT(3) for consulting the aircraft database or configuration elements (AMI, PinProg);

Flight plan modification services Serv_DAL+_PDV, which include:

services Serv_DAL+_PDV(1) for inserting/modifying elements of procedures, and navigation database elements identified above (airports, procedures for takeoff, landing, cruising, inputting of waypoints, go-around, etc.);

services Serv_DAL+_PDV(2) for inserting/modifying aircraft initialization data (weight, cruising level, Cost Index);

services Serv_DAL+_PDV(3) for inserting/modifying the aircraft environment (winds, temperatures and pressures predicted along the flight);

Services for computing trajectories (lateral, vertical) Serv_DAL+_TRAJ, which include:

services Serv_DAL+_TRAJ(1) for computing the lateral and vertical trajectory according to the flight plan defined and the flight plan-related characteristics defined in the services Serv_DAL+_PDV;

services Serv_DAL+_TRAJ(2) for computing a portion of lateral trajectory of the aircraft according to imposed lateral modes from among:

Acquisition and Holding of heading (Heading mode)

Acquisition and Holding of Course (Track or Course mode)

FMS Trajectory tracking (LNAV Lateral Navigation mode)

Radioelectric beam tracking (VOR, DME, LOC, etc.)

These modes are considered by way of examples, it being possible to add other conventional modes of the aircraft, such as roll holding.

services Serv_DAL+_TRAJ (3) for temporal integration with a view to obtaining predictions according to a vertical guidance mode from among:

Climb with fixed thrust and longitudinal speed setpoint (CAS, TAS, MACH or GS); so-called 'Open Climb' mode in the conventional terminology;

Climb with longitudinal speed setpoint and vertical speed setpoint (V/S); so-called "CLIMB VS/SPEED" mode in the conventional terminology;

Climb with longitudinal speed setpoint and slope setpoint (FPA); so-called "CLIMB FPA/SPEED" mode in the conventional terminology.

These modes are considered by way of examples, the other conventional modes of the aircraft can be added, such as attitude holding and attack angle holding. It will also be possible to consider the same modes corresponding to Descent, such as OPEN DES, etc.

the service Serv_DAL+_TRAJ(4) relating to the integration of the weather, in the form of measurements and a weather model, on the various levels;

the service Serv_DAL+_TRAJ(5) relating to the forced selection of particular configuration(s) as input parameters with a view to a simulation, such as for example: the number of failed engines, an engine degradation coefficient (perf factor, wear) or aerodynamic degradation coefficient (drag coefficient or drag factor).

The generic services Serv_DAL+_TRAJ(4) and Serv_DAL+_TRAJ(5) can advantageously be added to the list of services offered by the DAL+ core computer, and will make it possible to refine the computation of the generic services Serv_DAL+(1), Serv_DAL+(2) or Serv_DAL+(3).

Display services Serv_DAL+_MMI, which include:

a service Serv_DAL+_MMI(1) for dispatching the route (flight plan, trajectory) to the display screens;

a service Serv_DAL+_MMI(2) for dispatching elements of the navigation database (NAVDB, BDD airport) to the display screens;

Services for computing aircraft position Serv_DAL+_LOC: the FMS (or the PA) proposes to manage the aircraft position via:

a service Serv_DAL+_LOCO(1) for computing the aircraft vector (position, speed) as a function of the sensors (inertias, GNSS, navigation radiobeacons, etc.);

Services for computing trajectories (lateral, vertical) Serv_DAL+_GUID, which include:

a service Serv_DAL+_GUID(1) for dispatching the lateral guidance setpoints to the automatic devices of the aircraft that can be used by the method 202;

a service Serv_DAL+_GUID(2) for dispatching the vertical guidance setpoints to the automatic devices of the aircraft that can be used by the method;

a service Serv_DAL+_GUID(3) for dispatching the speed guidance setpoints to the automatic devices of the aircraft that can be used by the method 202; and that the FMS (or the PA) propose to manage the lateral and/or vertical guidance of the aircraft according to a desired mode;

Services for administering trajectory and guidance flight plans Serv_DAL+_ADMIN, which include:

a service Serv_DAL+_ADMIN(1) making it possible to manage the flight plans, to insert them, swap them, copy/paste them, etc.;

a service Serv_DAL+_ADMIN(2) making it possible to manage the trajectories, to insert them, swap them, copy/paste them, etc.;

a service Serv_DAL+_ADMIN(3) making it possible to manage the piloting automatic devices such as engagement/disengagement of guidance modes.

This list is given by way of example; it is neither exhaustive nor limiting, certain FMS type navigation computers carry out only a sub-part of these services, others carry out more of them such as the concentration of failures for other systems, digital communication with air traffic control (ATC for "Air Traffic Control") or company (AOC for Airline Operational Communications) ground stations.

Thereafter in the third step 208, a functional analysis of the function or application for optimizing route(s) under various constraints OPT_RTE is performed by decomposing the said function into a second plurality of elementary functions OPT_RTE_FU(1), . . . , OPT_RTE_FU(i), . . . OPT_RTE_FU(n_OPT_RTE_FU), i designating a pointer of the elementary functions from 1 to the total number n_OPT_RTE_FU of elementary functions.

Subsequently, "OPT_RTE AIRCRAFT" will denote the aircraft onboard which the constrained route optimization function OPT_RTE is embedded and which computes an optimized route of the said aircraft while complying with a set of external constraints (e.g. traffic, terrain, weather, failures, operations, etc.).

The elementary functions OPT_RTE_FU(1), . . . , OPT_RTE_FU(i), . . . OPT_RTE_FU(n_OPT_RTE_FU) in their order of sequencing of the constrained route optimization manoeuvre OPT_RTE are as follows:

A first elementary function OPT_RTE_FU(1) for selecting a "target route" defined from among one of the following elements:

a target airport: in the case of a diversion to a new destination, the aircraft quits its flight plan, and defines a new destination airport; the route over which the method will be applied then consists of only two elements: the aircraft current position, and the new airport;

a target reference route: in the case of a predefined route currently being flown, this route (flight plan) will be defined as the "target route" to search for the optimal trajectory;

a portion of target reference route: in the case of a diversion from a point of the flight plan in order to rejoin a new destination airport or another point of the route downstream or another defined point, the "target route" consists of the initial flight plan portion and of the target airport/point;

a reference trajectory: in the case of an optimization of the trajectory, free of the flight plan elements (waypoints, airways, takeoff and landing procedures), the target route consists of the reference trajectory;

a set of waypoints defined by the pilot: in the case of manually selecting avoidance, for example on an EFB or a tablet, the pilot selects a waypoint through which the aircraft must pass. This new element is created in the pilot base;

a set of waypoints and navigation beacons selected from the NAVDB: in the case of manually selecting avoidance, for example on an EFB or a tablet, the pilot selects a zone through which the aircraft must pass. Instead of creating a new element in the pilot base, use is made of points which already exist in the NAVDB and lie in the selected zone. This makes it possible to facilitate a future ATC agreement, not to create a point in a zone prohibited to navigation, to optimize the exchanges between DAL− and DAL+ equipment by retrieving only a restricted number of elements around the pilot's selection. This type of selection makes it possible to be more precise about the construction of the rerouting with respect to a manual selection on an EFB or tablet screen (vibrations, display scale). The selection of a waypoint belonging to a procedure will make it possible to continue the rerouting via the use of procedure (insertion of an airway for example);

A second elementary function OPT_RTE_FU(2) for computing the predictions along the flight plan and the trajectory, including in particular the aircraft's position predicted in 3D and optionally in time along the trajectory, the position predicted in time making it possible to manage the dynamic or evolving constraints;

A third elementary function OPT_RTE_FU(3) for selecting the constraints to be applied, these constraints being able to be defined by geographical geometric shapes or raw visual representations such as volumes (clouds, 3D airspaces, obstacles), surfaces in 3D (terrain), surfaces in 2D (boundaries, changes of airspaces);

A fourth elementary function OPT_RTE_FU(4) for selecting a minimum spacing to be complied with;

A fifth elementary function OPT_RTE_FU(5) for displaying the route and the constraints to an operator; this function allows the operator to control the problem of crossing between the route and the constraints;

A sixth elementary function OPT_RTE_FU(6) for detecting conflict between the current route and the constraints, this function being either static or dynamic if the constraints are evolving. It detects the geometric crossings between the route and the constraints, at less than the minimum spacing to be complied with;

A seventh elementary function OPT_RTE_FU(7) for displaying the navigation elements, arising from the databases, around the trajectory and/or around the constraints, this function being able to be automatic, or manual through operator "selection" of a zone, requesting the display of the navigation elements;

An eighth elementary function OPT_RTE_FU(8) for avoidance computation so as to resolve the conflict between the route and the constraint; it should be noted that numerous constrained route optimizers (or "solvers") exist on the market; this function can also be carried out manually by inputting (or creating pilot points) navigation elements or by creating an avoidance trajectory on the fly;

A ninth elementary function OPT_RTE_FU(9) for integrating the avoidance into the current route, which will be reused by the second elementary function OPT_RTE_FU(2) to determine the new flight plan, the new trajectory;

A tenth elementary function OPT_RTE_FU(10) for executing the new route;

An eleventh elementary function OPT_RTE_FU(11) for monitoring and following the evolution of the constraints at regular intervals.

Next, in the fourth step 210, for each elementary function OPT_RTE_FU(i) determined in the third step 208, one determines whether the elementary function OPT_RTE_FU(i) can be performed in part or entirely by a generic service Serv_DAL+(j) of the existing navigation computer 4 DAL+. Thus, on the basis of the second plurality of the elementary functions OPT_RTE_FU(i), a first list of the elementary functions that can be executed in part or entirely by at least one generic open service is determined together with, for each elementary function OPT_RTE_FU(i), a first sub-list of generic open service(s). Stated otherwise, a correspondence table (or mapping) is established between the elementary functions OPT_RTE_FU(i) of the application for computing a constrained optimized route OPT_RTE and the generic open service(s) usable by each of them.

Thus, it is determined that the core computer 4 DAL+ can deal with:

The second elementary function OPT_RTE_FU(2) for computing the predicted trajectory along the flight plan, which corresponds to the generic services Serv_DAL+_FPLN(1) and Serv_DAL+_TRAJ(1)

The fifth elementary function OPT_RTE_FU(5) for the route (flight plan, trajectory) display part which corresponds to the service Serv_DAL+_MMI(1)

The seventh elementary function OPT_RTE_FU(7) for displaying the navigation elements around the route and the constraints which corresponds to the service Serv_DAL+_MMI(2);

The ninth elementary function OPT_RTE_FU(9) for integrating the route modification into the aircraft route, which corresponds to the services Serv_DAL+_ADMIN(1) and Serv_DAL+_ADMIN(2)

The tenth elementary function OPT_RTE_FU(10) for executing the route which corresponds to the services Serv_DAL+_GUID(1), Serv_DAL+_GUID(2) and Serv_DAL+_GUID(3).

Next, in the fifth step 212, a global cost criterion CG is taken into account to determine an optimal functional and physical distribution of the elementary functions OPT_RTE_FU(i) within the onboard avionics system 2 over the set of possible distributions which minimizes the said global cost criterion CG.

Generally, the global cost criterion "CG" is dependent on several parameters, including at least the development cost of an elementary function in the DAL+ core computer.

According to a first embodiment CG1 of the global criterion CG, the global cost criterion CG1 depends only on the development cost of elementary functions within the DAL+ core and/or DAL+ level code library computer.

The other parameters that can be taken into account are: the development cost of the communication interfaces between the two computers 4 DAL+ and 6 DAL−, the cost in response time, the estimated maintenance cost, the training cost, the cost of maintaining and upgrading the function, and optionally other costs to be defined by the designer.

According to a second embodiment CG2 of the global cost criterion CG, it may be more beneficial overall to develop certain segments of code of low DAL level, in the DAL+ computer so as to minimize the exchanges that are expensive in terms of response time, setup of communication interfaces, and maintainability.

According to a third embodiment CG3 of the global cost criterion CG, it may be more beneficial overall to develop certain segments of code of low DAL level, in the DAL+ computer so as to minimize the complexity of the whole, from the perspective of maintenance and upgrades.

According to a fourth embodiment CG4 of the global cost criterion CG, it may be more beneficial overall to use DAL+ level code libraries, in the low DAL computer, to minimize the use of the resources of the DAL+ core computer 4.

Thereafter, in the sixth step 214, the implementation of the computations, interfaces and sequencing of the computations between the two computers 4 DAL+ and 6 DAL− is undertaken according to the optimal functional and physical distribution of the elementary functions OPT_RTE_FU(i) which minimizes the global cost criterion CG.

In the case where the first embodiment CG1 of the global criterion CG is considered, that is to say if only the additional development cost of the DAL+ core computer is integrated, the method 202 will allocate the elementary functions OPT_RTE_FU(2), OPT_RTE_FU(5), OPT_RTE_FU(7), OPT_RTE_FU(9) and OPT_RTE_FU(10) to the DAL+ core computer. Since the other elementary functions do not correspond to the critical functional ambit of a flight management system FMS or of an automatic pilot PA, these functions are intended rather to be integrated into a DAL− computer.

In the case where the second embodiment CG2 of the global criterion CG is considered, that is to say only the interface development cost is added to the additional development cost of the DAL+ computer, the method 202 decides to allocate only the tenth elementary function OPT_RTE_FU(10) to the DAL+ core computer, the control of the automatic devices corresponding to this function being critical for the aircraft, and having still to be managed by a computer of high DAL, that is to say DAL+, level. It should be noted that in this case the route computation and the integration of the trajectory of the other elementary functions OPT_RTE_FU(2), OPT_RTE_FU(5), OPT$_{13}$RTE_FU(7), OPT_RTE_FU(9) will without doubt be of poorer quality and reliability if it is developed in a DAL− computer of lower DAL. Operational procedures for reducing risk will have to be put in place to alleviate this defect such as graphical monitoring of the disparity, computation by the pilot, confirmation by a ground computer.

If the criticality level of a constrained route computation optimization software engine or optimizer (or "solver") is high, or if for interface or maintainability reasons, it is desirable to have continuity in the computation of avoidance, the method 202 will be able to decide in a third embodiment to allocate the eighth elementary function OPT_RTE_FU(8), in addition to the other five, to the DAL+ computer 4 and this will make it possible to have the sequencing of the computations of the elementary functions OPT_RTE_FU(7), OPT_RTE_FU(8), OPT_RTE_FU(9) and OPT_RTE_FU(10) in one and the same computer.

Finally in the seventh step 216, the constrained route(s) optimization function, integrated in an optimal manner into the navigation system by minimizing the global criterion CG, is executed by coupling the DAL+ core computer and the at least one DAL− peripheral computer.

Thus, the method 202 OPEN_OPT_RTE makes it possible to guarantee the strictly minimum development level of the function for constrained optimization of routes while minimizing the development cost, to integrate human factors into the cost criterion, such as the function familiarization time, the staff learning and training time, failure management time (i.e. maintenance time), to decouple the upgrades of the two computers DAL+ and DAL−, and to improve maintainability (staggering the deployment of the various functions over time without jeopardizing the key structuring elements of the systems, namely the "DAL+" computers), and to make best use of the open architecture concepts that are beginning to be seen in "DAL+" computers such as for example the FMS.

Figure 4:
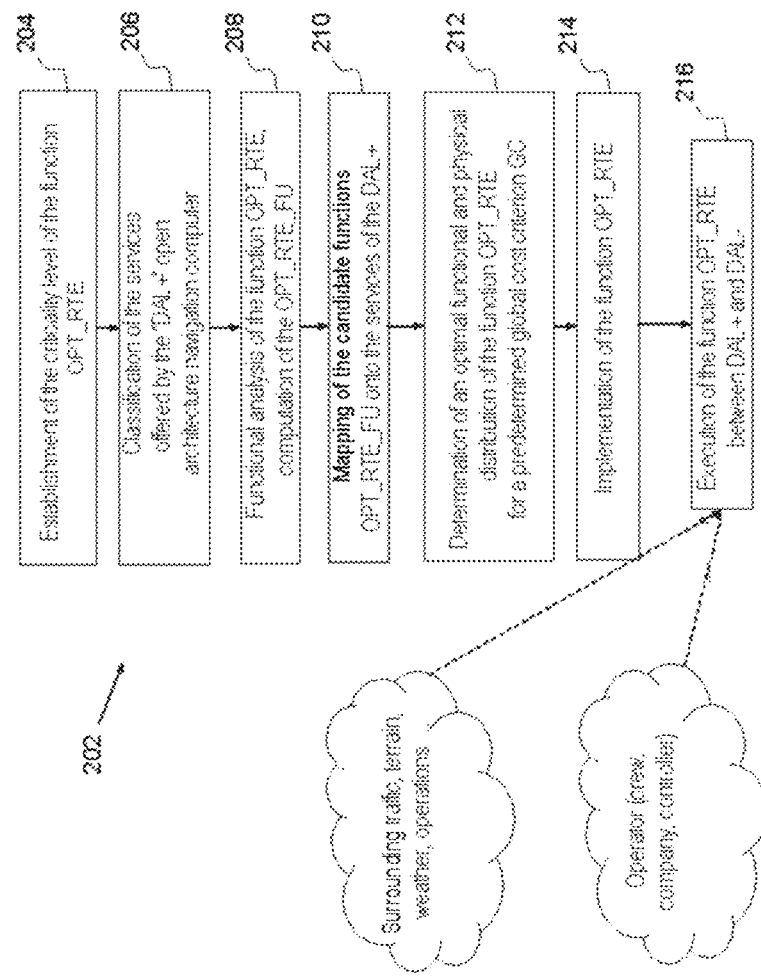
FIG. 4 is a flowchart of a method according to the invention for integrating the constrained aircraft route(s) optimization function between the DAL+ level FMS core computer and the DAL− peripheral computer for managing the constrained route optimization application.
Figure 5:
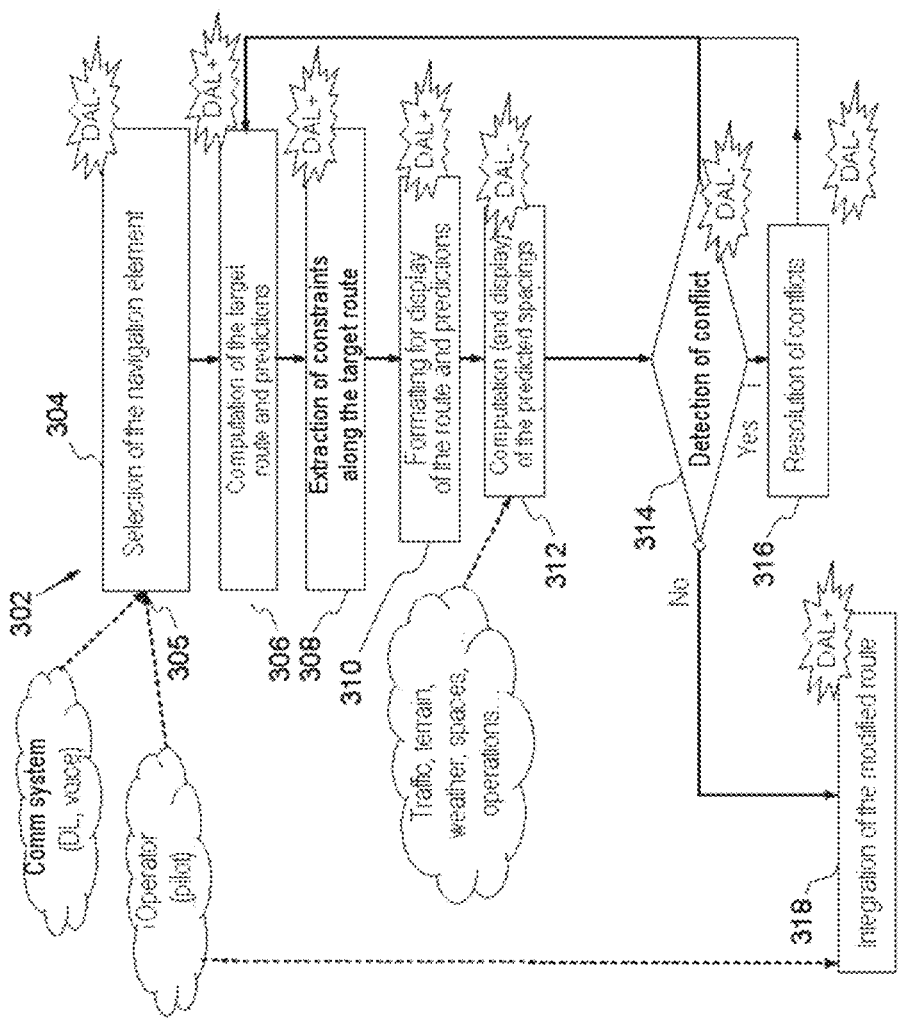
FIG. 5 is a flowchart of the execution of the constrained route(s) optimization function integrated according to the method of integration of the invention of FIG. 4.

According to FIG. 5 and a mode of implementation of the function OPT_RTE integrated according to the method of optimized integration of FIG. 4, the constrained route(s) optimization function 302 comprises, when it is executed by the integrating onboard avionics system a set of steps.

In a first step 304 and according to a first embodiment, the selection of the navigation element which corresponds to the execution of the first elementary function OPT_RTE_FU(1) is implemented by the DAL− computer 6. This selection is carried out by an interface with the operator, here the pilot, who operates the DAL− computer 6 and chooses the route or the portion of route or of trajectory on which he wants the optimization method OPT_RTE to run. This assumes that the DAL− computer 6 has subscribed to the route publications (flight plan, trajectory) of the DAL+ computer.

In an alternative, this step 304 is carried out by the DAL+ computer which in fact already has the route and the predictions, but does not necessarily have access to the other displays (terrain, company directives, etc.)

On exit from the first step 306, a "target route", consisting of flight plan elements ELT_PDV(1) . . . , ELT_PDV (N_pdv), is provided.

Optionally, the target route also contains simplified trajectory elements ELT_TRAJ_SIMP(1) . . . ELT_TRAJ_SIMP(N_traj), the trajectory being represented by simplified horizontal (lateral) and vertical elements since the DAL− computer does not have the services SERV_DAL+_PDV and SERV+_DAL_TRAJ making it possible to compute this trajectory in a reliable manner.

Next, in a second step 306 and according to the first embodiment, the computation of the flight plan/trajectory which corresponds to the execution of the second elementary function OPT_RTE_FU(2) is implemented by the DAL+ core computer 4.

In an alternative, the DAL− peripheral computer 6 executes this second step 306.

Thus, a set of N_traj complete trajectory elements and of N_PDV flight plan elements, comprising their geographical position at least in 2D, is available on exit from this second step 306. Advantageously, the predictions in terms of altitude, time, weather and fuel are linked to these elements. If these elements are merged into a notion of intermediate elements "ELT_INT" (their number being N=N_traj+ N_PDV), the following table 1 below is for example obtained:

TABLE 1

| Elt_int(1) | Predicted_Position(1) | Predicted_time(1), Predicted_Fuel(1) . . . |
|---|---|---|
| Elt_int(2) | Predicted_Position(2) | Predicted_Time(2), Predicted_Fuel(2) . . . |
| . . . | | |
| Elt_int(k) | Predicted_Position(k) | Predicted_Time(k), Predicted_Fuel(k) . . . |
| . . . | | |
| Elt_int(N) | Predicted_Position(N) | Predicted_Time(N), Predicted_Fuel(N) . . . |

Thereafter in a third step 308 and according to the first embodiment, the extraction of the constraints along the target route which corresponds to the execution of the third elementary function OPT_RTE_FU(3) is implemented by the DAL− peripheral computer 6.

Accordingly, ascertaining the positions of the elements which constitute the route, and optionally the transit times predicted for the dynamic contingencies, the DAL− computer 6 verifies whether geometric elements arising from the computers of contingencies and corresponding to contingencies or hazards such as, in particular, weather contingencies, terrain contingencies, traffic contingencies, and airspace closure contingencies, are encountered along this route.

These contingencies can be represented in the computer by:

vector fields (winds for example or surrounding aircraft traffic);

scalar fields: temperature, navigation beacons, ocean tracks;

surface fields: isobar, iso-icing, fronts, countries traversed, terrain;

volume fields: clouds, jet streams, turbulence zones, airspaces, airways with timetables.

These fields optionally have a temporal validity and the fields whose geographical (and optionally temporal) coordinates are less than a given threshold from the route will be extracted from the computers which determine them.

For example if the item of data is of surface field type, it is necessary to determine whether a polygon representing an element of surface type crosses the trajectory in the determined timeslot.

Let us take for example the surface defined by the layer of atmosphere at 0° where the risk of icing may occur if this layer is traversed in a cloud type moist zone. This surface consists of points, denoted here by SURF(lat, long, alt, time) for icing for example.

Figure 6:
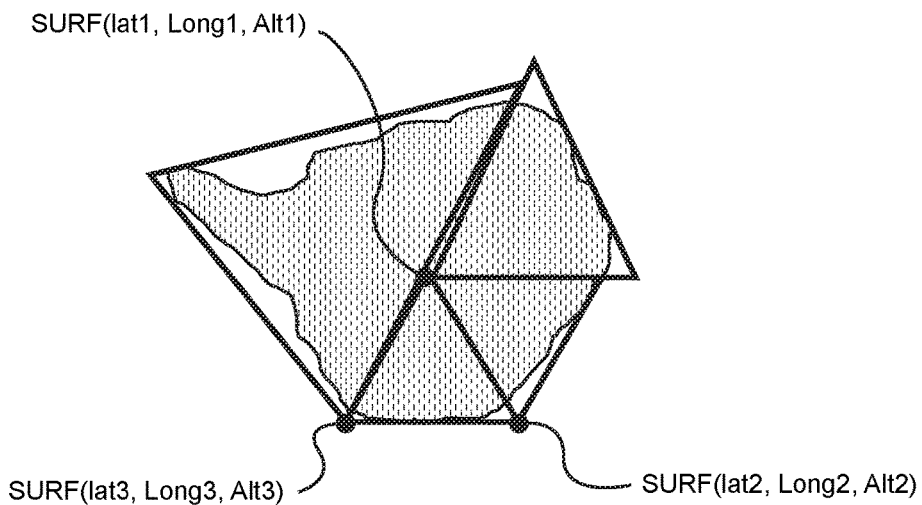
FIG. 6 is a view of a 3D three-dimensional surface, approximated by facets and used in a particular manner in a step of the execution of the integrated constrained route(s) optimization function of FIG. 5.

According to FIG. 6, the surface is composed of contiguous facets, here each facet being a triplet of points SURF. Conventional functions exist in the prior art which determine a matrix of facets approximating a surface.

Figure 7:
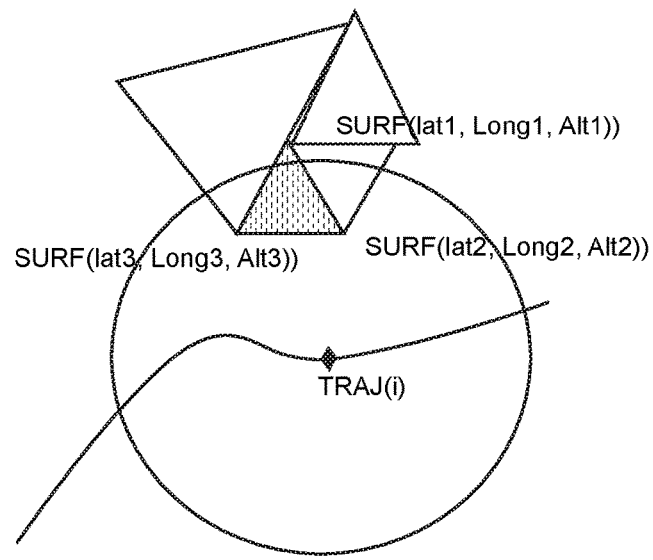
FIG. 7 is a view of a configuration envisaged in the algorithm of the constrained route optimization function OPT_RTE in which a facet of the 3D surface crosses the predicted trajectory of the aircraft.

In the example of FIG. 7 and in the third step 308, one determines whether the facet, defined by the triplet [SURF (lat1,long1,Alt1); SURF(lat2,long2,Alt2); SURF(lat3, long3,Alt3)] and described in FIG. 6, crosses the point TRAJ(i) which corresponds to an element ELT_INT(k) in the dashed airway of radius R (determined by the operator or by configuration), and optionally in the timeslot determined by [Predicted_time(k)−Start Time; Predicted_Time (k)+End Time], the variables Start_Time and end_Time being configurable and making it possible to consider only the contingencies or hazards which will occur when the aircraft passes temporally through the contingency.

Thus, the distances (Euclidean for example) between each of the three points of each facet, and the point TRAJ(i) are computed.

If at least one of the points of the facet is situated at a distance from the point TRAJ(i) that is less than the bound of the airway (here the radius of the ball of radius R centred on TRAJ(i)), then the candidate surface is retained, if the time of occurrence of the candidate points is in the time slice by [Time(TRAJ(i))+Start Time; Time(TRAJ(i))+End Time].

The method 302 retains the whole surface since a "piece" of nebulosity is not presented, rather the entire nebulosity in the case of a dangerous cloud for example.

N_CST constraint elements CST(1) . . . CST(N_Int) are thus available on exit.

Next in a fourth step 310 and according to the first embodiment, the shaping of the trajectory for display which corresponds to the execution of the fourth elementary function OPT_RTE_FU(4) is implemented by the DAL+ core computer 4.

Thereafter in a fifth step 312 and according to the first embodiment, the computation of the predicted spacings and their display which correspond to the fifth elementary function OPT_RTE_FU(5) is implemented by the DAL− peripheral computer 6.

In the first embodiment, this involves a spatial spacing, arising from a finer discretization of the trajectory into elements ELT_INT, compared with the constraints.

A finer second discretized table of N_fine trajectory elements ELT_INT_FINE is thus obtained together with their distance "Spacing" with respect to the various constraints, present at less than the extraction distance R as described by table 2 below:

TABLE 2

| Elt_int_FINE(1) | Spacing(1, CST(1)) | . . . | Spacing(1, CST(k)) | . . . | Spacing(1, CST(N_CST)) |
|---|---|---|---|---|---|
| Elt_int_FINE(2) | Spacing(2, CST(1)) | . . . | Spacing(2, CST(k)) | . . . | Spacing(2, CST(N_CST)) |
| . . . | | | | | |
| Elt_int_FINE(m) | Spacing(m, CST(1)) | . . . | Spacing(m, CST(k)) | . . . | Spacing(m, CST(N_CST)) |
| . . . | | | | | |
| Elt_int_FINE(N) | Spacing(N, CST(1)) | . . . | Spacing(N, CST(k)) | . . . | Spacing(N, CST(N_CST)) |

Next in a sixth step 314 and according to the first embodiment, the function for "detecting conflict" between an element ELT_Int_Fine(m) and a constraint CST(k) which corresponds to the sixth elementary function OPT_RTE_FU(6) is implemented by the DAL− computer 6. This detection function uses for example the following algorithm:

Loop from m=1 to N_ELT_Fine over the elements ELT_Int_Fine(m)
For every k between 1 and N_CST
If ∥ Spacing(m,CST(k))∥<Tolerance_spacing then
Conflict detected(m,k)=true
Else
Conflict detected(m,k)=false
Endif
End loop over k
End Loop over m
Tolerance_Spacing will be a value managed by DAL−.

In an alternative, conflict detection is performed by integrating a temporal criterion.

In the case where a conflict is detected, that is to say if Conflict detected(m,k)=true, the trajectory has too small a predicted spacing with respect to a constraint CST(k).

In a manual implementation, the conflicts will be displayed according to a particular symbology, and it will be up to the operator to alter the target route in order to distance himself from the constraint.

In an automated implementation, a seventh step 316 of resolving the conflict is implemented by the DAL− peripheral computer 6 by executing conventional algorithms known from the prior art such as for example traversing the table and distancing the elements ELT_INT_Fine(k) from the constraint with a value at least equal to the threshold.

In one embodiment, this distancing will be done on the basis of selecting elements of the navigation database (NAVDB) available to the operator or to the system by executing the seventh elementary function OPT_RTE_FU(7).

In another embodiment, the distancing can be carried out by creating flight plan points directly via their geographical coordinates.

In yet another embodiment, the distancing can be carried out by directly deforming the horizontal or vertical trajectory, manually or automatically, i.e. by displacing the intermediate elements ELT_INT_fine.

These considerations are also valid for temporal spacings by slowing/accelerating the aircraft. They correspond to the execution of the eighth elementary function OPT_RTE_FU(8).

A new "target route" is thus available on exit from this seventh step 316 and a branch to the second step is performed, using the new "target route".

In the case where sufficient conflicts or indeed all the conflicts are resolved and where the operator is happy with the new "target route", he will be able to activate an eighth step 318 of execution of the ninth elementary function OPT_RTE_FU(9) by the DAL+ core computer 4.

A validation by the operator in the DAL+ system will be performed after verification of the predictions and of the resolution of the conflicts (switch to the aircraft's so-called "active" guidance flight plan) via the tenth elementary function OPT_RTE_FU(10).

This new target route will be monitored and followed by the DAL− computer 6 by executing the eleventh elementary function OPT_RTE_FU(11).

Advantageously, because only what is strictly required for the function is performed in the existing navigation computer, it is possible to steer the performance of the latter in terms of response time.

It also makes it possible to safeguard the upgradability of the peripheral mission computer (in terms of CPU/RAM/ROM) in order to be able to address other new functions.

Figure 8:
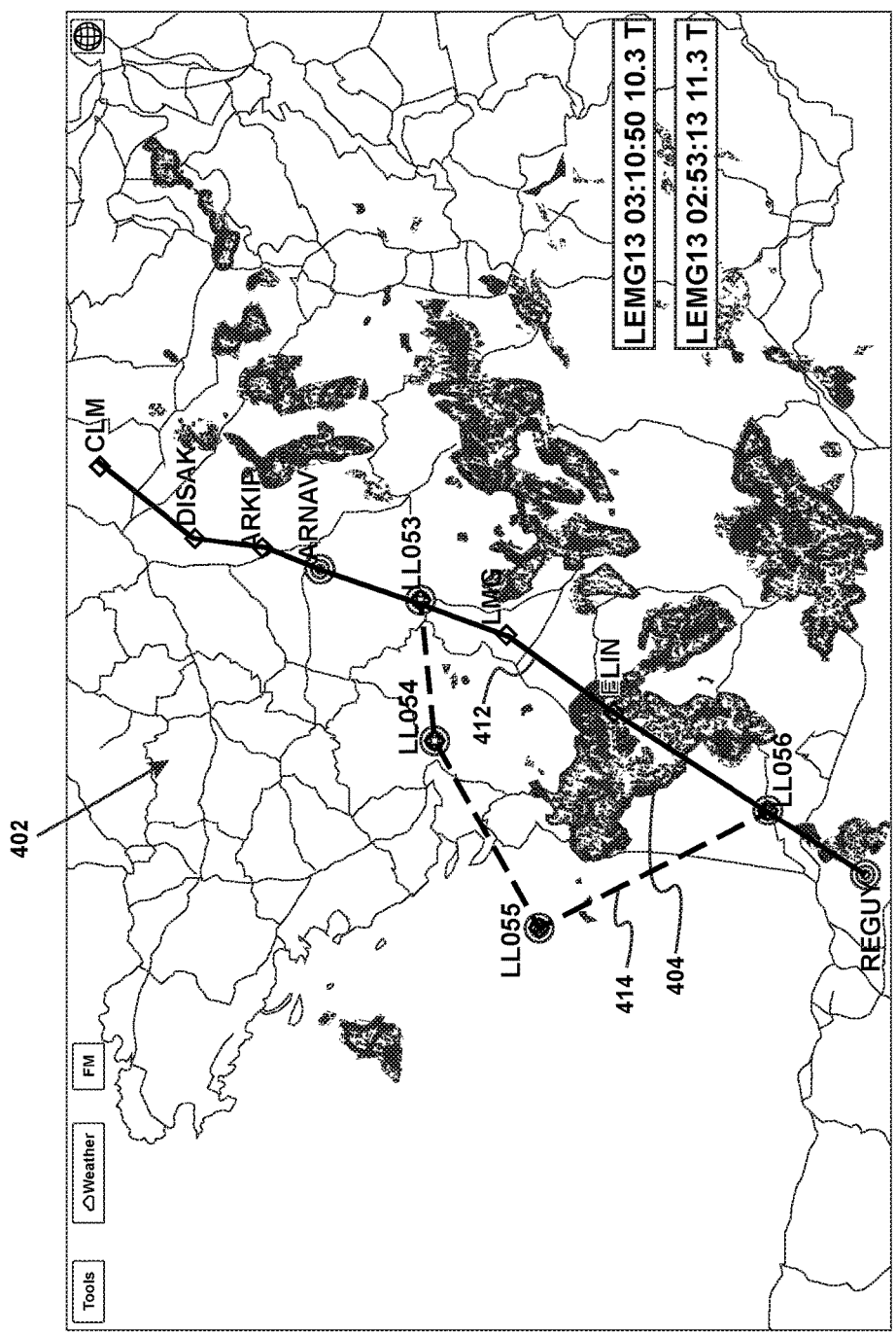
FIG. 8 is a view of a first aircraft route predicted initially in the absence of meteorological contingency and of a second route, predicted by the constrained route optimization application and which manages a meteorological contingency also represented in the Figure.

According to FIG. 8 and an application of the method 302 for constrained route optimization OPT_RTE, a geographical map 402 of France is represented with a meteorological contingency 404 over the South West. A first route 412 of an aircraft corresponding to an initially envisaged flight plan is plotted on the map 402 as having to cross the meteorological contingency 404. A second route 414, for bypassing the contingency 404, is proposed to the pilot by the onboard system of the aircraft integrating the constrained route(s) optimization function 302 described in FIG. 5, by displaying the said second route 414 on the map 402.

The invention claimed is:

1. A method for functionally and physically integrating a constrained aircraft route(s) optimization application into an avionics onboard system, the avionics onboard system comprising
a DAL+ digital core computer, having a first criticality level DAL+, integrated into an initial architecture of peripheral computers and databases having second criticality levels DAL−, lower than or equal to the first criticality level DAL+, and serving as server by hosting a first plurality of generic open services Serv_DAL+(j), and a DAL− peripheral computer for managing the constrained aircraft route(s) optimization application, having a second criticality level DAL−, which is lower than or equal to the first criticality level DAL+, and serving as client by dispatching requests for services to the DAL+ digital core computer and/or to the peripheral computers and databases of the initial architecture through a communications network, wherein the method for functionally and physically integrating the constrained aircraft route(s) optimization application comprises the steps of:

functionally decomposing the constrained aircraft route(s) optimization application OPT_RTE into a plurality of elementary functions OPT_RTE_FU(i); and determining, on a basis of the plurality of the elementary functions OPT_RTE_FU(i), a first list of the elementary functions that can be executed in part or entirely by at least one generic open service, and for each elementary function a first sub-list of generic open service(s); and determining an optimal functional and physical distribution of the elementary functions OPT_RTE_FU(i) within the onboard avionics system over a set of possible distributions which minimizes a global cost criterion CG, dependent on several parameters, including at least an additional development cost of the elementary functions integrated within the DAL+ digital core computer; and carrying out the integration of the constrained aircraft route(s) optimization application by actually implementing the elementary functions and their scheduling according to the optimal functional and physical distribution determined within the onboard avionics system in the previous step of determining the optimal functional and physical distribution of the elementary functions.

2. The method for functionally and physically integrating a constrained aircraft route(s) optimization application according to claim 1, wherein:

the optimal functional and physical distribution of the elementary functions OPT_RTE_FU(i) within the onboard avionics system over the set of possible distributions is determined so as to minimize a first global cost criterion CG1 which takes into account only the additional development cost of the elementary functions integrated within the DAL+ digital core computer; and the integration of the constrained aircraft route(s) optimization application is carried out by actually implementing the elementary functions and their scheduling according to the optimal functional and physical distribution determined within the onboard avionics system by using the first global cost criterion CG1.

3. The method for functionally and physically integrating a constrained aircraft route(s) optimization application according to claim 1, wherein the optimal functional and physical distribution of the elementary functions OPT_RTE_FU(i) within the onboard avionics system over the set of possible distributions is determined so as to minimize a second global cost criterion CG2 which also takes into account a development cost of communication interfaces between the DAL+ digital core computer and the peripheral computers, a cost in response time and a cost of maintainability so as to minimize communication exchanges; and the integration of the constrained aircraft route(s) optimization application is carried out by actually implementing the elementary functions and their scheduling according to the optimal functional and physical distribution determined within the onboard avionics system by using the second global cost criterion CG2.

4. The method for functionally and physically integrating a constrained aircraft route(s) optimization application according to claim 1, wherein:

the optimal functional and physical distribution of the elementary functions OPT_RTE_FU(i) within the onboard avionics system over the set of possible distributions is determined so as to minimize a third global cost criterion CG3 which also takes into account a development of certain segments of code of low DAL level in the DAL+ digital core computer so as to minimize a complexity of a whole from a perspective of maintenance and upgrades; and the integration of constrained aircraft route(s) optimization application is carried out by actually implementing the elementary functions and their scheduling according to the optimal functional and physical distribution determined within the onboard avionics system by using a third global cost criterion CG3.

5. The method for functionally and physically integrating a constrained aircraft route(s) optimization application according to claim 1, wherein:

the optimal functional and physical distribution of the elementary functions OPT_RTE_FU(i) within the onboard avionics system over the set of possible distributions is determined so as to minimize a fourth global cost criterion CG4 which also takes into account the use of DAL+ level code libraries in the DAL− peripheral computer level so as to minimize a use of resources of the DAL+ digital core computer; and the integration of the constrained aircraft route(s) optimization application is carried out by actually implementing the elementary functions and their scheduling according to the optimal functional and physical distribution determined within the onboard avionics system by using the fourth global cost criterion CG4.

6. The method for functionally and physically integrating a constrained aircraft route(s) optimization application according to claim 1, further comprising an additional step, executed after having determined an optimal functional and physical distribution of the elementary functions OPT_RTE_FU(i) within the onboard avionics system, and comprising:

the constrained aircraft route(s) optimization application performance being verified and evaluated by emulation or simulation, and/or a performance of initial services implemented on the DAL+ digital core computer and the peripheral computers being verified.

7. The method for functionally and physically integrating a constrained aircraft route(s) optimization application according to claim 1, wherein:
the DAL+ digital core computer hosts services Serv_DAL+(j) for computing flight plan, lateral trajectory and temporal predictions according to a specified guidance mode, which are used for the implementation of part of the elementary functions forming the constrained aircraft route(s) optimization application; and
the DAL+ digital core computer is coupled to computers for piloting an aircraft.

8. The method for functionally and physically integrating a constrained aircraft route(s) optimization application according to claim 1, wherein the first plurality of generic services Serv_DAL+(j) comprises the following services:
Computation of a location of an aircraft,
Flight plan insertion/modification,
Lateral trajectory computation,
Vertical trajectory computation,
Computation of aircraft performance,
Lateral guidance,
Vertical guidance,
Guidance in terms of speed,
Consultation of navigation database,
Consultation of aircraft performance database,
Consultation of configuration database,
Consultation of magnetic declination database,
Display of a route and of a trajectory, and
Display of the database elements.

9. The method for functionally and physically integrating a constrained aircraft route(s) optimization application according to claim 1, wherein the constrained aircraft route(s) optimization application comprises the following elementary functions:
a first elementary function OPT_RTE_FU(1) for selecting a "target route";
a second elementary function OPT_RTE_FU(2) for computing predictions along a flight plan and a trajectory
a third elementary function OPT_RTE_FU(3) for selecting constraints to be applied;
a fourth elementary function OPT_RTE_FU(4) for selecting a minimum spacing to be complied with;
a fifth elementary function OPT_RTE_FU(5) for displaying a route and the constraints to an operator;
a sixth elementary function OPT_RTE_FU(6) for detecting conflict between a current route and the constraints;
a seventh elementary function OPT_RTE_FU(7) for displaying navigation elements arising from the databases around the trajectory and/or around the constraints;
an eighth elementary function OPT_RTE_FU(8) for avoidance computation to resolve a conflict between the route and the constraint;
a ninth elementary function OPT_RTE_FU(9) for integrating the avoidance into the current route, intended to be reused by the second elementary function OPT_RTE_FU(2) to determine a new flight plan (a new trajectory);
a tenth elementary function OPT_RTE_FU(10) for executing a new route
an eleventh elementary function OPT_RTE_FU(11) for monitoring an evolution of the constraints at regular intervals.

10. The method for functionally and physically integrating a constrained aircraft route(s) optimization application according to claim 9, wherein:
the elementary functions OPT_RTE_FU(2), OPT_RTE_FU(5), OPT_RTE_FU(7), OPT_RTE_FU(7) and OPT_RTE_FU(10) are allocated to the and implemented in the DAL+ digital core computer,
while the remaining elementary functions are allocated and implemented in a DAL− peripheral computer of a system integrating the constrained aircraft route(s) optimization application.

11. The method for functionally and physically integrating a constrained aircraft route(s) optimization application according to claim 9, wherein:
an elementary function FIM_FU(10) which corresponds to a service Serv_DAL+(4) for the selected guidance mode and a selected navigation element is allocated to the and implemented in the digital DAL+ digital core computer,
while remaining elementary functions are allocated and implemented in a DAL− peripheral computer of the system integrating the constrained aircraft route(s) optimization application.

12. The method for functionally and physically integrating a constrained aircraft route(s) optimization application according to claim 9, wherein:
the elementary functions OPT_RTE_FU(2), OPT_RTE_FU(5), OPT_RTE_FU(7), OPT_RTE_FU(8) and OPT_RTE_FU(10) are allocated to the and implemented in the DAL+ digital core computer,
while the remaining elementary functions are allocated and implemented in a DAL− peripheral computer of a system integrating the constrained aircraft route(s) optimization application.

13. The method for functionally and physically integrating a constrained aircraft route(s) optimization application according to claim 9, wherein the first elementary function OPT_RTE_FU(1) comprises selecting a "target route" defined by one of the following elements: a target airport, a target reference route, a portion of target reference route, a reference trajectory, a set of waypoints defined by a pilot, a set of waypoints and of navigation beacons selected from a navigation database.

14. The method for functionally and physically integrating a constrained aircraft route(s) optimization application according to claim 9, wherein:
the second elementary function OPT_RTE_FU(2) computes predictions along the flight plan and the trajectory, including a predicted position in 3D and optionally in time of the aircraft along the trajectory, a predicted position in time making it possible to manage dynamic or evolving constraints.

15. The method for functionally and physically integrating a constrained aircraft route(s) optimization application according to claim 9, wherein:
the third elementary function OPT_RTE_FU(3) selects constraints to be applied, these constraints being defined by geographical geometric shapes or raw visual representations comprising at least one of the following: volumes which model clouds, 3D airspaces and obstacles, surfaces in 3D comprising terrain surfaces, surfaces in 2D, boundaries, and changes of airspaces.

16. An avionics onboard system configured to implement a constrained aircraft route(s) optimization application and integrate it functionally and physically, the avionics onboard system comprising:
a DAL+ digital core computer, having a first criticality level DAL+, integrated into an initial architecture of peripheral computers and databases having second criticality levels DAL−, lower than or equal to the first criticality level DAL+, and serving as server by hosting a first plurality of generic open services Serv_DAL+(j), and
a DAL− peripheral computer for managing the constrained aircraft route(s) optimization application, having a second criticality level DAL−, and serving as client by dispatching service requests to the DAL+ digital core computer and/or to the peripheral computers and peripheral databases of the initial architecture through a communications network,
the constrained aircraft route(s) optimization application OPT_RTE being decomposed into a plurality of elementary functions OPT_RTE_FU(i) distributed physically between the DAL+ digital core computer and the DAL peripheral management computer according to an optimal distribution scheme determined by the method of integration defined according to claim 1,
the DAL− peripheral computer being configured to support an application from among:
an MMI,
an integrated MSI,
a CMU,
a TCAS,
a TAWS,
an EFB,
a tablet,
a TRAFFIC COMPUTER, and
a dedicated generic partition, and
the DAL+ digital core computer being configured to support an application from among:
a flight management system FMS,
an Automatic Pilot, and
an FMGS system combining the FMS and Automatic Pilot functions.

\* \* \* \* \*